United States Patent [19]
Cragoe, Jr. et al.

[11] 3,929,872
[45] Dec. 30, 1975

[54] INDANACETIC ACID COMPOUNDS

[75] Inventors: Edward J. Cragoe, Jr., Lansdale; Everett M. Schultz, Ambler; Otto W. Woltersdorf, Jr., Chalfont, all of Pa.

[73] Assignee: Merck & Co., Inc., Rahway, N.J.

[22] Filed: Oct. 12, 1973

[21] Appl. No.: 405,966

[52] U.S. Cl... 260/515 R; 260/247.7 V; 260/268 C; 260/308 D; 260/326.5 C; 260/469; 260/473 R; 260/515 A; 260/520; 260/544 M; 260/558 R; 260/590; 260/618 B; 424/248; 424/250; 424/274; 424/317

[51] Int. Cl.² .................................... C07C 63/595

[58] Field of Search............ 260/515 R, 515 A, 469

[56] References Cited
FOREIGN PATENTS OR APPLICATIONS

| | | | |
|---|---|---|---|
| 1,958,918 | 5/1970 | Germany | 260/515 R |
| 2,255,247 | 5/1973 | Germany | 260/515 R |

OTHER PUBLICATIONS

Pollini, G. P. et al., Farmaco Ed. Sci., 1970, 25(3) 234–236.

*Primary Examiner*—Lorraine A. Weinberger
*Assistant Examiner*—Paul Killos
*Attorney, Agent, or Firm*—Michael C. Sudol, Jr.; David L. Rose; J. Jerome Behan

[57] ABSTRACT

Substituted 1-oxo-5-indanacetic acids and their salts, esters, and amides are disclosed. The products display a dual pharmaceutical utility in that they exhibit diuretic, saluretic, and uricosuric activity. The acid products are prepared by treating a substituted acryloylphenylacetic acid with certain Lewis acids.

8 Claims, No Drawings

INDANACETIC ACID COMPOUNDS

DESCRIPTION OF THE INVENTION

This invention relates to a new class of chemical compounds which can be described generally as substituted 1-oxo-5-indanacetic acids and to the non-toxic, pharmacologically acceptable salt, ester, and amide derivatives thereof. This invention also relates to methods for the preparation of said substituted 1-oxo-5-indanacetic acids and salts, esters, and amides thereof. Pharmacological studies show that the instant products are effective diuretic and saluretic agents which can be used in the treatment of conditions associated with electrolyte and fluid retention. The instant products are also useful in the treatment of hypertension. In addition, these compounds are able to maintain the uric acid concentration in the body at pretreatment levels or even effect a decrease in the uric acid concentration.

When administered in thereapeutic dosages in conventional vehicles, the instant products effectively reduce the amount of sodium and chloride ions in the body, lower dangerous excesses of fluid levels to acceptable levels and, in general, alleviate conditions associated with edema. In addition, these compounds overcome a major problem associated with many of the presently available diuretics and saluretics. Many of the presently available diuretics and saluretics have a tendency to induce hyperuricemia which may precipitate uric acid or sodium urate, or both, in the body which may induce from mild to severe episodes of gout. The instant compounds of this invention now provide an effective tool to treat those patients requiring diuretic and saluretic treatment without incurring the risk of inducing gout.

The substituted 1-oxo-5-indanacetic acids (I) of this invention have the following structural formula:

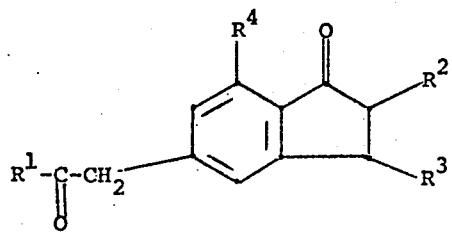

wherein $R^1$ is hydroxy or the alkali metal or alkaline earth metal salts thereof; alkoxy, amino, and $-NR^5R^6$ wherein $R^5$ and $R^6$ are the same or different radical selected from hydrogen, loweralkyl, loweralkoxy or tetrazolyl; also $R^5$ and $R^6$ can be joined together to form, with the nitrogen atom to which they are attached, a heterocyclic ring containing one or more hetero atoms selected from oxygen sulfur or nitrogen, such as morpholinyl, piperazinyl, pyrrolidinyl, and the like;

$R^2$ is hydrogen, loweralkyl, benzyl, or cycloalkyl;
$R^3$ is hydrogen, loweralkyl, or phenyl, provided that $R^2$ and $R^3$ are not hydrogen at the same time; and
$R^4$ is hydrogen, halogen, or loweralkyl.

The term "loweralkyl" when employed herein is deemed to include both straight and branched chain alkyl groups of from 1 to 6 carbon atoms such as methyl, ethyl, propyl, isopropyl, tert butyl, pentyl, and hexyl. The term "loweralkoxy" is deemed to include the alkoxy groups, both straight and branched chain, which contain from 1 to 6 carbon atoms such as methoxy, ethoxy, propoxy, butyloxy, isopentoxy, dimethyl butoxy, and the like. The term "cycloalkyl" includes saturated carbocyclic rings of from 4 to 6 carbon atoms.

The term "halogen" includes the four halogen atoms fluorine, chlorine, bromine, and iodine. The alkali metal salts included within the above definition are those derived from sodium and potassium. The alkaline earth metal salts are those derived from magnesium and calcium.

The preferred embodiments of this invention are realized in the above structural formula when $R^1$ is hydroxy; $R^2$ is hydrogen, methyl, ethyl, or benzyl; $R^3$ is hydrogen, methyl, ethyl, or phenyl; and $R^4$ is hydrogen, chlorine, bromine, methyl, or ethyl.

The compounds of the instant invention are prepared by treating an appropriately substituted p-acryloylphenylacetic acid with a Lewis acid, for example concentrated sulfuric acid, polyphosphoric acid, trifluoroacetic acid, boron trifluoride and the like, as shown in the flow sheet below.

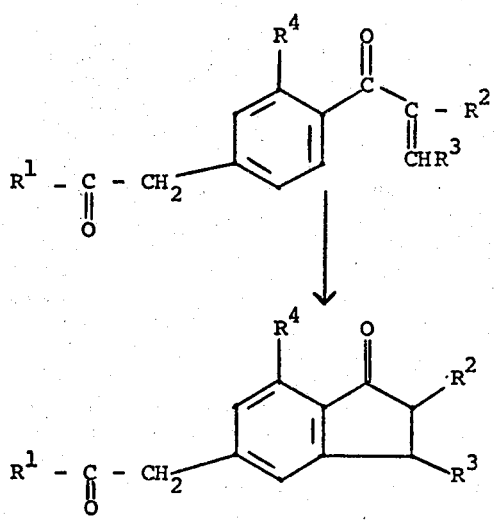

$R^1$, $R^2$, $R^3$, and $R^4$ are as previously defined.

The reaction may be conducted at a temperature of from 0°C. to about 60°C. In general the reaction is conducted at ambient temperature.

The Lewis acid is used in sufficient quantity to provide for a 2 to 10 fold excess of said acid over the stoiciometric equivalent. The reaction is run without a solvent and is complete in from 15 minutes to 5 hours. Generally when the reaction is run at ambient temperatures the reaction is complete in from 1 to 2 hours.

The substituted p-acryloylphenylacetic acid starting materials may be prepared by any of several known processes. In general such starting materials are known and a procedure for their preparation may be found in U.S. Pat. No. 3,352,901.

Also included within the scope of this invention are the ester and amide derivatives of the instant products as well as the alkali metal and alkaline earth metal salts thereof. Such derivatives may be prepared either before or after the cyclization reaction with the determining factor being the stability of the particular derivative in the concentrated acid cyclization medium. For example, the alkali metal and alkaline earth metal salt derivative would instantly react with the cyclization medium and thus must be prepared after the cyclization reaction.

The ester derivatives of the acetic acid moiety may be prepared by the reaction thereof with an alcohol, for example a loweralkanol. The amide derivatives may be prepared by converting the acetic acid function to its corresponding acid halide, preferably the acid chloride, by reaction with, for example, thionyl chloride, followed by treating said acid halide with ammonia, an appropriate mono-loweralkyl amine, di-loweralkyl amine, heterocyclic substituted amine such as aminotetrazole, or a heterocyclic amine such as piperidine, morpholine, pyrrolidine, and the like, to produce the corresponding amide compound.

The metal salts of the acetic acid function are prepared by treating said acid with an alkali metal or alkaline earth metal hydroxide, alkoxide, or hydride such as sodium hydroxide, potassium hydroxide, sodium methoxide, calcium hydride and the like.

These and other equivalent methods for the preparation of the ester and amide derivatives of the instant products will be apparent to one having ordinary skill in the art and to the extent that said derivatives are both non-toxic and physiologically acceptable to the body system, said derivatives are the functional equivalents of the corresponding substituted 1-oxo-5-indanacetic acids.

The novel compounds of this invention are diuretic and saluretic agents. In addition, these compounds are also able to maintain the uric acid concentration within the normal limits. The compounds of this invention can be administered in a wide variety of therapeutic dosages in conventional vehicles as, for example, by oral administration in the form of a tablet or by intravenous injection. Also, the daily dosage of the products may be varied over a wide range as, for example, in the form of scored tablets containing 5, 10, 25, 50, 100, 150, 250, and 500 milligrams of the active ingredient for the symptomatic adjustment of the dosage to the patient to be treated. The total daily dose of the active ingredient will generally be from 5 mg. to 2000 mg. These dosages are well below the toxic or lethal dose of the products.

A suitable unit dosage form of the products of this invention can be administered by mixing 100 milligrams of a substituted 1-oxo-5-indanacetic acid (I) or a suitable salt, ester or amide derivative thereof, with 99 mg. of lactose and 1 mg. of magnesium stearate and placing the 200 mg. mixture into a No. 1 gelatin capsule. Similarly, by employing more of the active ingredient and less lactose, other dosage forms can be put up in No. 1 gelatin capsules and, should it be necessary to mix more than 200 mg. of ingredients together, larger capsules may be employed. Compressed tablets, pills, or other desired unit dosages can be prepared to incorporate the compounds of this invention by conventional methods, and if desired, can be made up as elixirs or as injectable solutions by methods well known to pharmacists. An effective amount of the drug is ordinarily supplied at a dosage level of from about 1 mg. to about 50 mg/kg. of body weight. Preferably the range is from about 1 mg. to 7 mg/kg. of body weight.

It is also within the scope of this invention to combine two or more of the compounds of this invention in a unit dosage form or to combine one or more of the compounds of this invention with other known diuretics and saluretics or with other desired therapeutic and/or nutritive agents in dosage unit form.

The following example is included to illustrate the preparation of a representative dosage form:

Dry-filled capsules containing 100 mg. of active ingredient per capsule

|  | Per Capsule |
| --- | --- |
| 1-Oxo-2-methyl-7-chloro-5-indanacetic acid | 100 mg. |
| Lactose | 297 mg. |
| Magnesium Stearate | 3 mg. |
| Capsule (Size No. 1) | 400 mg. |

The 1-oxo-2-methyl-7-chloro-5-indanacetic acid is reduced to a No. 60 powder and then lactose and magnesium stearate are passed through a No. 60 bolting cloth onto the powder and the combined ingredients admixed for 10 minutes and then filled into a No. 1 dry gelatin capsule.

Similar dry-filled capsules can be prepared by replacing the active ingredient of the above example by any of the other novel compounds of this invention.

It will be apparent from the foregoing description that the 2,3,7-substituted-1-oxo-5-indanacetic acid products (I) of this invention constitute a valuable class of compounds which have not been prepared heretofore. One skilled in the art will also appreciate that the processes disclosed in the above examples are merely illustrative and are capable of a wide variation and modification without departing from the spirit of this invention.

EXAMPLE 1

1-Oxo-2-Ethyl-5-Indanacetic Acid

Finally powdered 4-(2-methylenebutyryl)phenylacetic acid (2.8 g., 0.013 moles) is added at 5°–10°C. with stirring to 10 ml of 96% sulfuric acid. The mixture is stirred at 20°–25°C. for 1 1/2 hours and poured into 200 ml. of water. The solid material is filtered and washed with water until the washings are neutral. The product is dried in air affording 1-oxo-2-ethyl-5-indanacetic acid.

EXAMPLE 2

1-Oxo-2-Ethyl-7-Chloro-5-Indanacetic Acid

Following the procedure of Example 1 using 2.52 g. (0.01 moles) of 4-(3-chloro-2-methylenebutyryl)-phenylacetic acid and 10 ml. of 96% sulfuric acid there is obtained 1-oxo-2-ethyl-7-chloro-5-indanacetic acid.

EXAMPLE 3

1-Oxo-2-Ethyl-7-Methyl-5-Indanacetic Acid

Following the procedure of Example 1 using 2.32 g. ().01 moles) of 3-methyl-4-(2-methylenebutyryl)-phenylacetic acid and 10 ml. of 96% sulfuric acid there is obtained 1-oxo-2-ethyl-7-methyl-5-indanacetic acid.

EXAMPLE 4

1-Oxo-2,3-Dimethyl-5-Indanacetic Acid

Following the procedure of Example 1 using 2.18 g (0.01 moles) of 4-(2-ethylidenepropionyl)phenylacetic acid and 10 ml. of 96% sulfuric acid there is obtained 1-oxo-2,3-dimethyl-5-indanacetic acid.

EXAMPLE 5

1-Oxo-2-Ethyl-7-Bromo-5-Indanacetic Acid

Following the procedure of Example 1 using 2.9 g. (0.01 moles) of 3-bromo-4-(2-methylenebutyryl)-phenylacetic acid and 10 ml. of 96% sulfuric acid there is obtained 1-oxo-2-ethyl-7-bromo-5-indanacetic acid.

EXAMPLE 6

1-Oxo-3-Phenyl-5-Indanacetic Acid

Following the procedure of Example 1 using 2.6 g. (0.01 moles) of 4-(3-phenylacryloyl)phenylacetic acid and 10 ml. of 96% sulfuric acid there is obtained 1-oxo-3-phenyl-5-indanacetic acid.

EXAMPLE 7

1-Oxo-2-Benzyl-5-Indanacetic Acid

Following the procedure of Example 1 using 2.8 g. (0.01 moles) of 4-(2-methylene-3-phenylpropionyl)-phenylacetic acid and 10 ml. of 96% sulfuric acid there is obtained 1-oxo-2-benzyl-5-indanacetic acid.

EXAMPLE 8

1-Oxo-2-Cyclopentyl-7-chloro-5-Indanacetic Acid

3-Chloro-4-(2-cyclopentylacryloyl)phenylacetic acid (2.9 g., 0.01 moles) is combined with 10 ml. of 96% sulfuric acid in the manner described in Example 1 affording 1-oxo-2-cyclopentyl-5-indanacetic acid.

EXAMPLE 9

1-Oxo-2-Ethyl-5-Indanacetamide

A. 1-Oxo-2-Ethyl-5-Indanacetyl Chloride

To a solution of 4.36 g. (0.02 moles) of 1-oxo-2-ethyl-5-indanacetic acid in 15 ml. of benzene is added 4.76 g. (0.04 moles) of thionyl chloride. The reaction mixture is heated at reflux for one hour. The solution is evaporated to dryness under reduced pressure. The residue is dissolved in benzene and again the solvent is removed under reduced pressure to yield crude 1-oxo-2-ethyl-5-indanacetyl chloride.

B. 1-Oxo-2-Ethyl-5-Indanacetamide

The 1-oxo-2-ethyl-5-indanacetyl chloride of Step A is cooled to 0°C. and to it is added 50 ml. of cold (0°C.) concentrated ammonium hydroxide. The resulting solid is collected, and dried to yield 1-oxo-2-ethyl-5-indanacetamide.

PREPARATION

Preparation of Starting Materials
3-Chloro-4-(2-cyclopentylacryloyl)Phenylacetic Acid A. Preparation of 3-[(3-chloro-4-cyclopentylacetyl)-phenyl]-Propionic Acid Aluminum chloride (61.0 g., 0.456 moles) and 3-chlorohydrocinnamic acid (25.8 g., 0.140 moles) is added to carbon disulfide (200 ml.) and the mixture stirred at 50°C. for 10 minutes. The mixture is then cooled to 25°C. and cyclopentylacetyl chloride (25.6 g., 0.175 moles) is added dropwise over a one-half hour period. After the addition of the acetal chloride, the mixture is heated in a water bath at 50°C. for 5 hours then cooled in an ice bath and the carbon disulfide decanted. While cooling in an ice bath, ice water (100 ml.) and concentrated hydrochloric acid (15 ml.) is added to the dark gummy residue. The oil that separates is extracted with ether and the ether solution then extracted with five 100 ml. portions of 5% sodium bicarbonate. The bicarbonate extract is acidified with hydrochloric acid to yield 3-[(3-chloro-4-cyclopentylacetyl)phenyl]propionic acid.

B. Preparation of 3-[3-chloro-4-(1-hydroxy-2-cyclopentylethyl)-phenyl] Propionic Acid The compound prepared in Step A (31.3 g., 0.110 moles) is dissolved in a solution of sodium hydroxide (7 g.) in water (100 ml.) and a solution of sodium borohydride (1.69 g.) in water (25 ml.) is added over 0.75 hour. The brown complex is then hydrolyzed by adding solid sodium hydroxide (15 g.) and then boiling for 1 hour. The cooled mixture is extracted with ether and the ether extract washed well with water and dried over sodium sulfate. After removing the ether by evaporation 3-[3-chloro-4-(1-hydroxy-2-cyclopentylethyl)-phenyl]-propionic acid is obtained which is used in the next step without purification.

C. Preparation of Methyl 3-[3-chloro-4-(1-hydroxy-2-cyclopentylethyl)phenyl]propionate The compound prepared in Step B (27.0 g.) is dissolved in methanol (250 ml.) and the temperature adjusted to 0°C. and concentrated sulfuric acid (7 ml.) carefully added. The mixture is kept at 0°C. for 16 hours (a higher temperature causes etherification of the hydroxy group) and then water (1 liter) is added. The aqueous mixture is extracted with ether (three 60 ml. portions) and the ether extracts washed with 10% sodium bicarbonate (50 ml.) and dried over sodium sulfate. Upon removing the ether by evporation the residue is distilled to give methyl 3-[3-chloro-4-)1-hydroxy-2-cyclopentylethyl)-phenyl]propionate.

D. Preparation of 3-[3-chloro-4-(1-hydroxy-2-cyclopentylethyl)-phenyl]-1,1-diphenylpropanol-1

To a Grignard reagent prepared from magnesium (12.4 g., 0.5 moles) and bromobenzene (80 g., 0.5 moles) in ether (160 ml.) is added over one-half hour a solution of the compound prepared in Step C (12.8 g., 0.041 moles) in tetrahydrofuran (THF, 40 ml.) a gentle stream of nitrogen is led through the flask and the mixture refluxed for 5 hours, ether being replaced by THF as it evaporates by entrainment with nitrogen (a total of 240 ml. of THF is used). The dark brown mixture obtained is cooled and added to a mixture of ice (400 g.) and concentrated hydrochloric acid (100 ml.). The layers are separated and the water layer extracted with three 75 ml. portions of ether. The combined THF and ether extracts are then washed with dilute hydrochloric acid, water 5% sodium hydroxide, and again with water. The solvent is evaporated and the residue submitted to steam distillation to remove the biphenyl formed in the reaction (3.5 liters of distillate is collected). The residue remaining is cooled, extracted with ether, and the crude product isolated by evaporating the ether. The crude product is dissolved in a minimum amount of benzene and placed on a column of neutral alumina (140 g.). The column is eluted with benzene (2 liters) and the effluent containing by-products discarded. The product is removed from the column by eluting with ether (600 ml.). Further elution by ethanol (500 ml.) yields an additional quantity of 3-[3-chloro-4-(1 -hydroxy-2-cyclopentylethyl)phenyl]-1,1-diphenylpropanol-1which is used as is in the next step.

E. Preparation of 3-[(3-chloro-4-cyclopentylacetyl)-phenyl]-1,1-diphenylpropanol-1

The compound prepared in Step D (5.3 g., 0.0122 moles) is dissolved in acetone (35 ml.) and the solution cooled to −15°C. A solution of chromium trioxide (2.44 g., 0.0244 moles) in a mixture of water (5 ml.) and concentrated sulfuric acid (2 ml.) is added with stirring over 1 hour. The mixture is kept at −10°C. for 4 hours and then poured onto ice. The aqueous mixture is extracted with ether, the ether extract washed with water until clear, dried over sodium sulfate, and evaporated to give 3-[(3-chloro-4-cyclopentylacetyl)-phenyl]-1,1-diphenylpropanol-1 which is used in the next step without purification.

F. Preparation of 2'-Chloro-4'-(3,3-diphenylallyl)cyclopentylacetophenone

A solution of the compound prepared in Step E (9 g.) in acetic acid (90 ml.) and acetic anhydride (50 ml.) is refluxed for 1 hour and the solvents then removed by evaporation at reduced pressure. The residue is dissolved in ether and the ether solution washed in sodium bicarbonate solution and then water, and dried over sodium sulfate. Upon removing the ether by evaporation there is obtained 2'-chloro-4'-(3,3-diphenylallyl)-cyclopentylacetophenone.

G. Preparation of 3-Chloro-4-(cyclopentylacetyl)-phenylacetic Acid

The compound prepared in Step F (9.9 g., 0.00264 moles) is dissolved in chloroform (10 ml.) and the solution warmed to 40°C. A solution of chromium trioxide (1.0 g., 0.01 moles) in water (2 ml.) and acetic acid (5.4 ml.) then is added dropwise with stirring. The temperature rises to 46°C. and a black solid precipitates. When the temperature begins to fall the mixture is heated at 50°C. for 20 minutes. The solvents are removed at 35°C. under reduced pressure and dilute hydrochloric acid and ether are added to the residue. The ether solution is washed with dilute hydrochloric acid until clear and then with 10% sodium bicarbonate solution (25 ml.). When the bicarbonate extract is acidified, 3-chloro-4-(cyclopentylacetyl)phenylacetic acids separates as an oil that soon solidifies.

H. Preparation of 3-Chloro-4-(2-cyclopentylacryloyl)-Phenylacetic Acid

3-Chloro-4-(cyclopentylacetyl)phenylacetic acid (1.14 g., 0.0041 moles) prepared in Step G is mixed with dimethylaminehydrochloride (0.335 g., 0.0041 moles), paraformaldehyde (0.15 g. 0.0041 moles) is added and the mixture is heated on a steam bath for 1 hour. Water (100 ml.) is added and the mixture extracted with ether. The aqueous layer is separated and made basic with sodium bicarbonate, heated on a steam bath at 90°C. for 10 minutes then cooled and acidified whereupon the mixture becomes cloudy. The aqueous mixture is extracted with ether and the ether then evaporated leaving 3-chloro-4-(2-cyclopentylacryloyl)phenylacetic acid.

What is claimed is:

1. A compound having the formula:

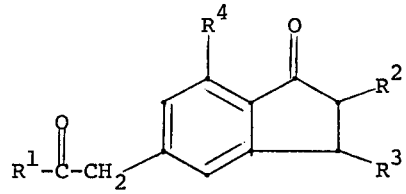

wherein $R^1$ is hydroxy, alkali metal alkaline earth metal salts thereof and lower alkoxy; $R^2$ is hydrogen, lower alkyl and lower cycloalkyl; $R^3$ is hydrogen and lower alkyl and $R^4$ is hydrogen, lower alkyl or halogen.

2. A compound of claim 1 having the formula:

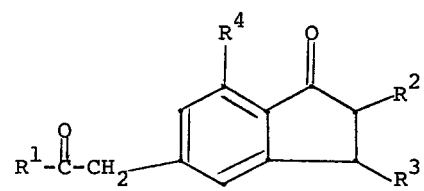

wherein $R^1$ is hydroxy, alkali metal and alkaline earth metal salts thereof; $R^2$ is lower cycloalkyl; $R^3$ is hydrogen or lower alkyl and $R^4$ is hydrogen, lower alkyl or halogen.

3. The compound of claim 1 which is 1-oxo-2-ethyl-5-indanacetic acid.

4. The compound of claim 1 which is 1-oxo-2-ethyl-7-chloro-5-indanacetic acid.

5. The compound of claim 1 which is 1-oxo-2-ethyl-7-methyl-5-indanacetic acid.

6. The compound of claim 1 which is 1-oxo-2,3-dimethyl-5-indanacetic acid.

7. The compound of claim 1 which is 1-oxo-2-ethyl-7-bromo-5-indanacetic acid.

8. The compound of claim 1 which is 1-oxo-2-cyclopentyl-7-chloro-indanacetic acid.

* * * * *

UNITED STATES PATENT OFFICE
CERTIFICATE OF CORRECTION

PATENT NO. : 3,929,872

DATED : December 30, 1975

INVENTOR(S) : Edward J. Cragoe, Jr., Everett M. Schultz and Otto W. Woltersdorf, Jr.

It is certified that error appears in the above-identified patent and that said Letters Patent are hereby corrected as shown below:

In claim 1, column 8, line 17, insert the word --and-- between "alkali metal"

and "alkaline earth metal"

Signed and Sealed this twentieth Day of April 1976

[SEAL]

Attest:

RUTH C. MASON
*Attesting Officer*

C. MARSHALL DANN
*Commissioner of Patents and Trademarks*